United States Patent
Liu et al.

(10) Patent No.: US 7,203,504 B2
(45) Date of Patent: Apr. 10, 2007

(54) METHOD OF BUILDING A LOCATING SERVICE FOR A WIRELESS NETWORK ENVIRONMENT

(75) Inventors: Chien-Tsung Liu, Jhonghe (TW); Ting-Yueh Hung, Jhonghe (TW)

(73) Assignee: Institute for Information Industry, Da-an District, Taipei (TW)

( * ) Notice: Subject to any disclaimer, the term of this patent is extended or adjusted under 35 U.S.C. 154(b) by 134 days.

(21) Appl. No.: 10/995,389

(22) Filed: Nov. 24, 2004

(65) Prior Publication Data

US 2006/0063535 A1     Mar. 23, 2006

(30) Foreign Application Priority Data

Sep. 21, 2004    (TW) .............................. 93128521 A

(51) Int. Cl.
*H04Q 7/20* (2006.01)
(52) U.S. Cl. .............................. 455/456.5; 455/456.1; 701/207
(58) Field of Classification Search ............. 455/67.11, 455/456.1, 456.6, 456.2, 456.3, 456.4, 456.5, 455/404.1, 440; 701/207, 214, 300
See application file for complete search history.

(56) References Cited

U.S. PATENT DOCUMENTS

| | | | |
|---|---|---|---|
| 2003/0216144 A1* | 11/2003 | Roese et al. ............. | 455/456.1 |
| 2005/0096068 A1* | 5/2005 | Bahl et al. ............... | 455/456.1 |
| 2005/0258957 A1* | 11/2005 | Krumm et al. ......... | 340/539.13 |

* cited by examiner

*Primary Examiner*—William Trost
*Assistant Examiner*—James D. Ewart
(74) *Attorney, Agent, or Firm*—Bacon & Thomas, PLLC

(57) ABSTRACT

A method of building a locating service for a wireless network environment includes: an environment input step, a detection point calculation step, a measuring step and an assumed non-detected position point step to find measured position points and to measure a four-directional signal strength of the measured position point. By assuming signal strengths of non-detected position points, an entire positioning system can be established. A measuring process includes a portable device signal measuring step, a position point calculation step, and a signal feed back step to send the corresponding position information to the portable device to provide information to a user.

9 Claims, 4 Drawing Sheets

METHOD OF BUILDING A LOCATING SERVICE FOR A WIRELESS NETWORK ENVIRONMENT

BACKGROUND OF THE INVENTION

1. Field of the Invention

The present invention relates to a locating service method and, more particularly, to a method of building a locating service for a wireless network environment.

2. Description of the Related Art

LBS (Location-Based System) is mainly used for providing current geographic location or absolute position information services to a user of a wireless device. In so doing, the service provider can provide even more services and information to their users.

The LBS can be used in both indoor environments and outdoor environments; for different environments, different application technologies are utilized. For outdoor environments, GPS (global positioning system) technology is very popular, working via a link between a portable wireless device and a satellite, the satellite utilizing different positioning technologies to obtain a location and sending this location information back to the portable wireless device. For indoor environments, due to shielding effects from buildings, the GPS technology cannot be used; however, since wireless networks are increasingly popular, a locating technology that works using the wireless network has been developed.

The wireless network location-based system is built around the IEEE 802.11 environment, utilizing: a signal strength positioning method, a receiving angle positioning method, a receiving time positioning method, and a mixed time difference and receiving angle positioning method. However, indoor environments can sometimes be very complicated, and have various routes. Consequently, the receiving angle and time might have large errors, and so the signal strength positioning method offers greater accuracy.

In the technology of wireless positioning, many signal strength positioning estimation methods are available that utilize an access point. However, different environmental conditions, and other varying factors, can affect electromagnetic radiation. To improve data accuracy, the positioning system manufacturer needs to actually measure each position point to build up a signal strength database, which requires a great deal of time and effort.

Therefore, it is desirable to provide a method of building a locating service for a wireless network environment to mitigate and/or obviate the aforementioned problems.

SUMMARY OF THE INVENTION

An objective of the present invention is to provide a method of building a locating service for a wireless network environment to solve the above-mentioned problems.

In order to achieve the above-mentioned objective, the method of building a locating service for a wireless network environment comprises: an environment input step, a detection point calculation step, a measuring step and an assumed non-detected position point step to find measured position points and measure four-directional signal strengths. Furthermore, by assuming the signal strengths of non-detected position points, an entire positioning system can be established. Additionally, a measuring process includes: a portable device signal measuring step, a position point calculation step, and a signal feed back step to send the corresponding position information to the portable device to inform a user.

The environment input step divides an environment into a plurality of position points, setting some position points as obstacles according to environmental information. The detection point calculation step obtains a plurality of suggested detection points via a detection algorithm. The measuring step measures the suggested detection points and at least one positioning signal strength from the suggested detection points to establish a relational list between the at least one positioning signal strength and the suggested detection points. The assumed non-detected position points step assumes at least one positioning signal strength from a plurality of non-detected position points via an assumption calculation, adding the assumption information to the relational list.

Since every position point in the relational list has positioning signal strengths for different directions, the system can provide a directional positioning service.

The portable device signal measuring step measures at least one positioning signal strength value from a portable device at a current location. The position point calculation step compares the at least one positioning signal strength value from the portable device with the positioning signal strengths in the relational list and obtains corresponding position information according a positioning algorithm. The position modification step modifies the corresponding positioning information via a modification model. The service integration step actives a back-end application service according the corresponding positioning information. The signal feed back step sends the corresponding position information to the portable device to inform a user.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
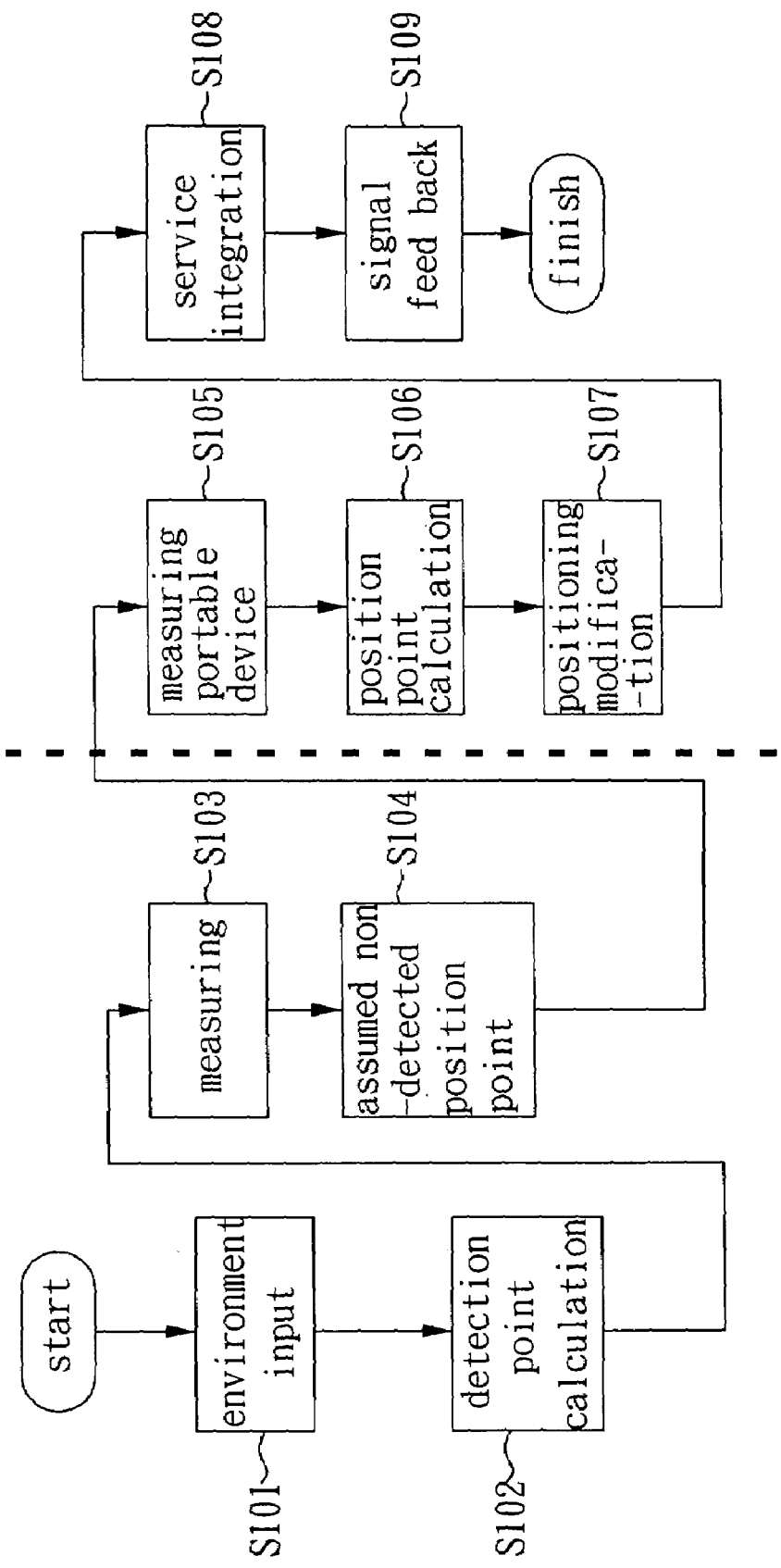
FIG. 1 is a flowchart of a preferred embodiment according to the present invention.

Please refer to FIG. 1. FIG. 1 is a flowchart of a preferred embodiment according to the present invention. As shown in drawing, the present invention utilizes the following steps: an environment input step (S101), a detection point calculation step (S102), a measuring step (S103), an assumed non-detected position point step (S104), a portable device signal measuring step (S105), a position point calculation step (S106), a positioning modification step (S107), a service integration step (S108), and a signal feed back step (S109).

Figure 2:
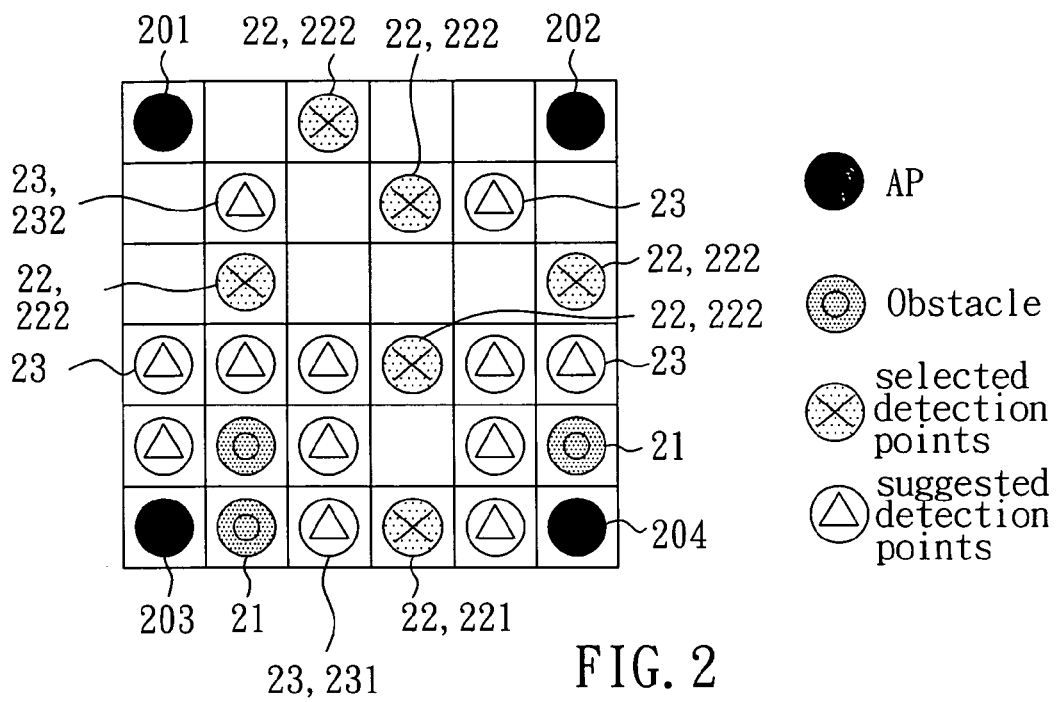
FIG. 2 illustrates a step for calculating detection points in the preferred embodiment according to the present invention.

Please refer to FIG. 2. FIG. 2 is a schematic drawing of a step for calculating detection points for the preferred embodiment of the present invention. In the environment input step (S101), a location-based system divides an entire network into a plurality of position points, for example 36 position points, setting an access point as position points 201, 202, 203, 204, and an obstacle position points 21. In the detection point calculation step (S102), the system utilizes a detection algorithm to obtain a position point that needs to be measured.

Figure 4:
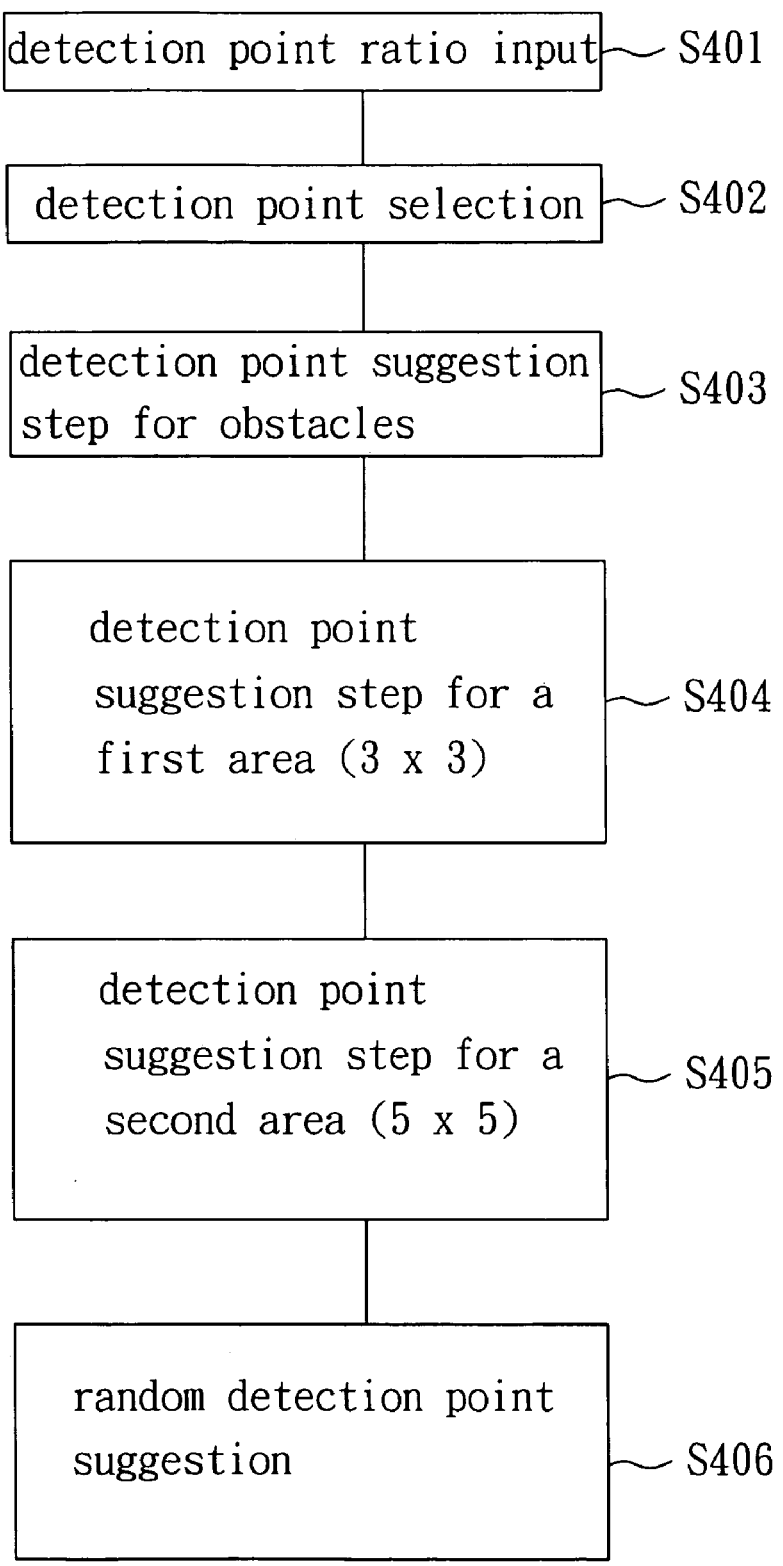
FIG. 4 is a flowchart of a detection algorithm in the preferred embodiment according to the present invention.

Please refer to FIG. 4. FIG. 4 is a flowchart of the detection algorithm in the preferred embodiment according to the present invention. As shown in drawing, the detection algorithm comprises: an detection point ratio input step (S401), a detection point selection step (S402), a detection point suggestion step for obstacles (S403), a detection point suggestion step for a first area (S404), a detection point suggestion step for a second area (S405), and a random detection point suggestion step (S406).

In the detection point ratio input step (S401), a detection point ratio is input to provide a position point number that indicates how many position points need to be measured for their respective signal strengths; for example, if the ratio is 1:2, then for 36 position points, at least 18 position points need to be actually measured. In the detection point selection step (S402), a few selected detection points 22 are set, which are usually points that are difficult to measure, such as a position point 221 among obstacles. In the detection point suggestion step for obstacles (S403), all position points 231 around the obstacle position points 21 are set as suggested detection points 23. In the detection point suggestion step for a first area (S404), all position points which are not obstacles 21, or other detection points (including the selected detection points 22 and the suggested detection points 23) are sequentially selected; if a 3×3 surrounding area has within it no obstacle and other detection point (including the selected detection points 22 and the suggested detection points 23), this position point is set as a suggested point 232, as shown in FIG. 2. In a detection points suggestion step for a second area (S405), all position points which are not obstacles 21 or other detection points (including the selected detection points 22 and the suggested detection points 23) are sequentially selected, if within their 3×3 surrounding area there are no obstacle 21 and other detection points (including the selected detection points 22 and the suggested detection points 23), then this position point is set as a suggestion point 23. In the random detection point suggestion step (S406), a ratio of the number of all detection points (including the selected detection points 22 and the suggested detection points 23), and the number of all position points, is compared with the input detection point ratio; for example, in FIG. 2, there is 1 selected detection point 22, and 12 suggested detection points 23, which does not match the predetermined detection point ratio of 1:2, and so the other requested five selected detection points 22 are randomly selected from other points that are not obstacles 21 and detection points 22, 23 by the system and set as selected detection points 222.

Please refer again to FIG. 1 and FIG. 2. In the measuring step (S103), a portable device can be utilized to measure the signal strengths separately from four access points 201, 202, 203, 204 at all selected detection points 22, and the suggested detection points 23, when facing front, back, left and right, and a relational list between the positioning signal strengths and the position points is built up.

Figure 3:
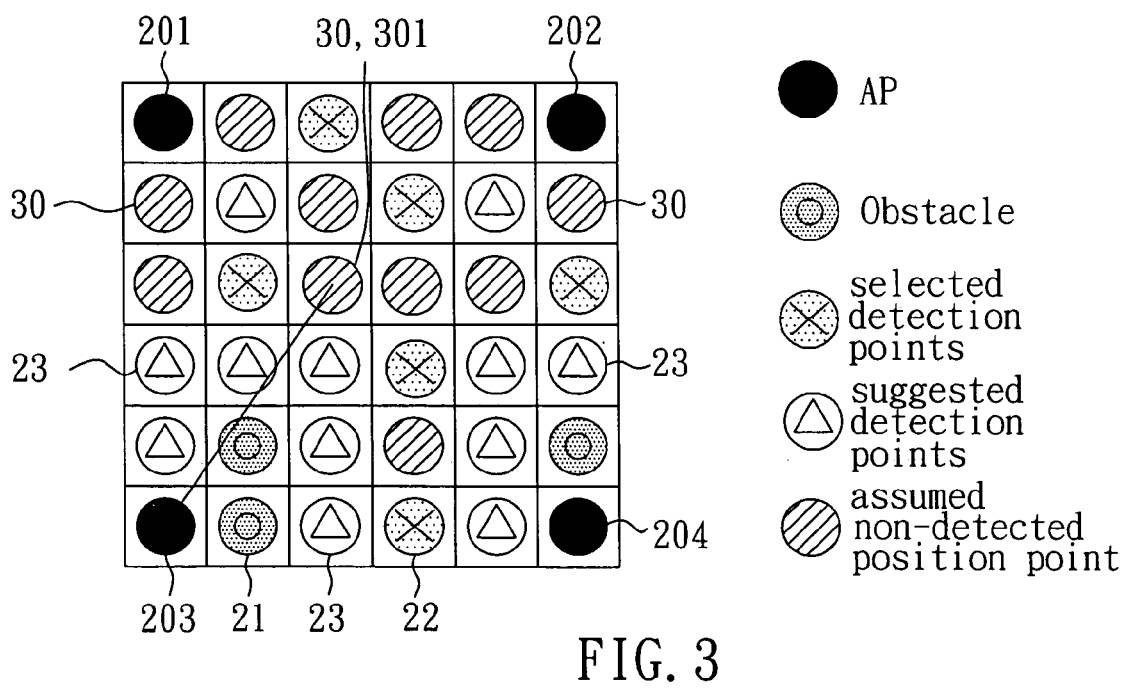
FIG. 3 illustrates an assumed non-detected position point step in the preferred embodiment according to the present invention.

In FIG. 3, the assumed non-detected position point step utilizes the formula to obtain positioning signal strengths from four directions, and adds the positioning signal strengths into the relational list; wherein, d is a distance between the positioning point and an access point, $d_0$ is a distance between a signal obtained point and the access point, WAF is an obstacle fading factor, n is a signal fading factor, nW is the number of obstacles between the positioning point and the access point, and $P(d_0)$ is the signal strength of the signal obtained point. Afterwards, all four directions of the positioning signal strengths of every position point in the system are added into the relational list to provide a complete positioning structure.

The above-mentioned factor nW is the number of obstacles between the positioning points and the access points. However, if nW exceeds a predetermined obstacle number threshold value C, the formula changes to:

$$P(d) = P(d_0) - 10n\log\left(\frac{d}{d_0}\right) - C \times WAF,$$

to better ensure the accuracy of the assumed positioning signal strengths.

The above-mentioned signal obtained signal points are any selected reference position points located on a link between the positioning point and the access point. The factor $P(d_0)$ is the positioning signal strength, and the reference points are usually based upon the access point, so that $d_0=1$.

Please refer again to FIG. 1 and FIG. 3. In the portable device signal measuring step (S105), the portable device that needs position information measures from four directions the position signal strengths of four access points 201, 202, 203, 204 at its current position and sends these signal strengths back to the system. In the position point calculation step, the system compares the position signal strengths with the position signal strengths in the relational list and obtains several matching position points and a most possible position point according a Viterbi algorithm.

Figure 5:
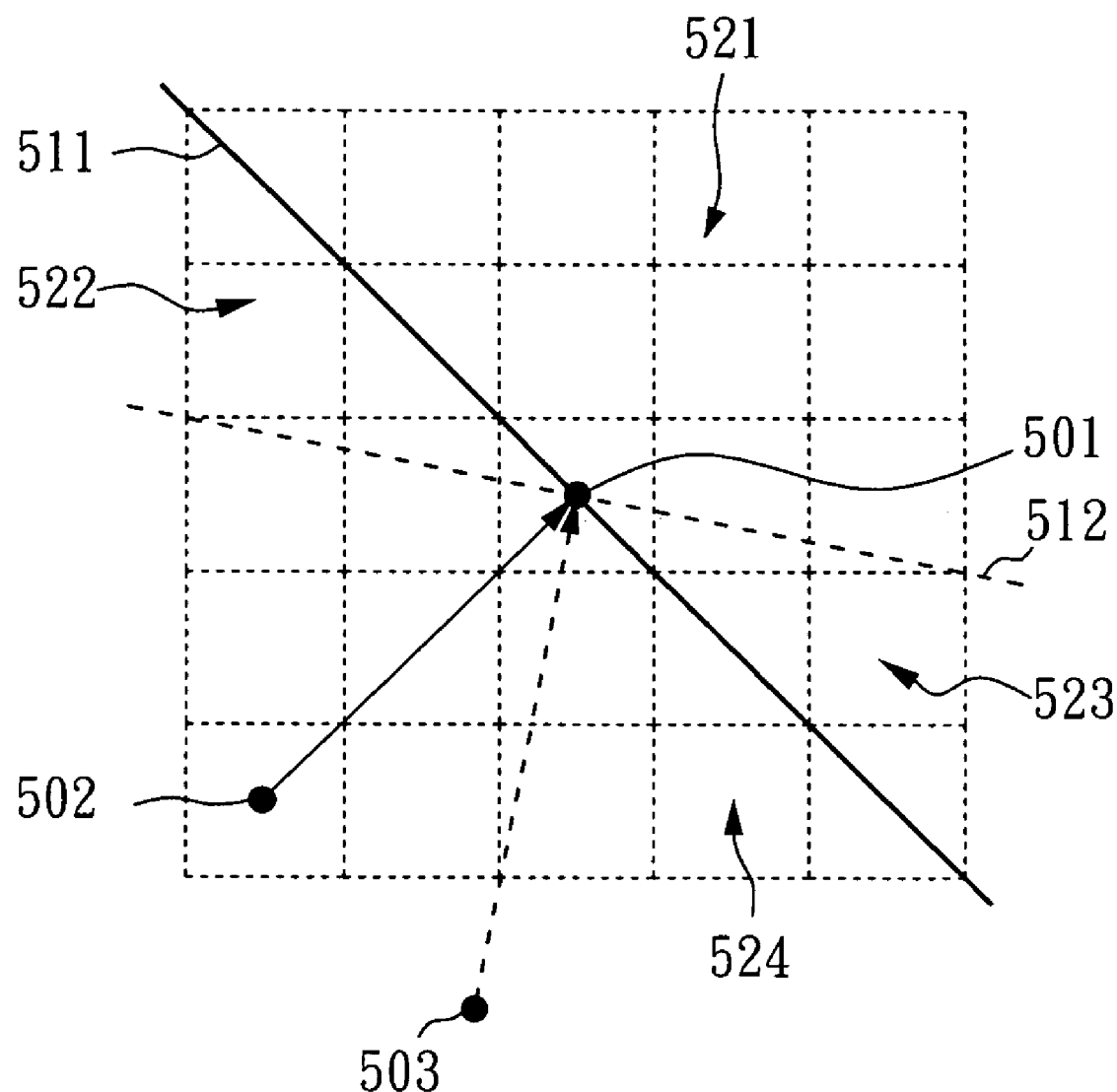
FIG. 5 illustrates a Viterbi algorithm for the preferred embodiment according to the present invention.

Regarding the Viterbi algorithm, please refer to FIG. 5. A position point 501 is a previous position point, a position point 502 is an even more previous position point; these two points are connected via a directional line, and an orthogonal straight line 511 perpendicular to the directional line is added at the position point 501. Similarly, an N times previous position point 503 and the position point 501 can be connected by another directional line and another corresponding orthogonal line 512 can also be obtained. The line 511 and the line 512 use the position point 501 as a center to generate four areas: area 521, area 522, area 523 and area 524. A human behavior model is utilized, which assumes that the chance of moving forward is larger than the chance of turning, and even larger than the chance of moving backwards; therefore, assuming the chance of moving from the position point 502 to the position point 501 is A (A>0.5), and the chance of moving from the position point 503 to the position point 501 is B (B>0.5), the most possible position point will be located in area 521, with a probability of A×B. The probabilities of the area 522 and the area 523 are (1−A)×B and A×(1−B), while the area 524 has the lowest probability of (1−A)×(1−B).

Furthermore, in the positioning modification step, a modification model (such as human movement inertia, movement speed and previous characteristics, etc.) is utilized to modify the obtained possible position point. The service integration step (S108), activates a back-end application service (such as message service or other interactive service provided by another program) according to the corresponding positioning information. In the signal feed back step (S109), the corresponding position information and the back-end application service are sent to the portable device to provide the information to the user via a network.

Although the present invention has been explained in relation to its preferred embodiment, it is to be understood that many other possible modifications and variations can be made without departing from the spirit and scope of the invention as hereinafter claimed.

What is claimed is:

1. A method of building a locating service in a location-based system for a wireless network environment comprising:

an environment input step for dividing an environment into a plurality of position points and setting a position point as an obstacle according to environment information; a detection point calculation step for obtaining a plurality of suggested detection points according to a detection algorithm;

a measuring step for measuring the suggested detection points and at least one positioning signal strength from the suggested detection points to establish a relational list between the at least one positioning signal strength and the suggested detection points;

an assumed non-detected position points step for assuming and adding to the relational list at least one positioning signal strength from a plurality of non-detected position points according to an assumption calculation;

a portable device signal measuring step for measuring at least one positioning signal strength from a portable device at a current location;

a position point calculation step for comparing the at least one positioning signal strength from the portable device with the positioning signal strengths in the relational list and obtaining corresponding position information according to a positioning algorithm; and a signal feed back step for sending the corresponding position information to the portable device to inform a user, wherein the detection algorithm comprises:

a detection point ratio input step for inputting a detection point ratio into the location-based system;

a detection point selection step for setting a plurality of selected detection points;

a detection point suggestion step for obstacles for selecting a plurality of position points around a plurality of obstacles and setting the plurality of position points as a plurality of suggested detection points;

a detection point suggestion step for a first area for selecting a plurality of non-obstacles and non-detection point position points and setting the position points as a plurality selected detection points when a first area around every position point has no obstacles, selected detection points or suggested detection points;

a detection point suggestion step for a second area for selecting a plurality of non-obstacles and non-detection point position points and setting the position points as a plurality selected detection points when a second area around every position point has no obstacles, selected detection points or suggested detection points; and a random detection point suggestion step for selecting a plurality of non-obstacles and non-detection point position points and setting the position points as a plurality of selected detection points so that a ratio between a total number of the suggested detection points and the selected detection points and a number of the position points in the location-based system is larger than the input detection point ratio.

2. The method of building a locating service in a location-based system for a wireless network environment as claimed in claim 1, wherein the assumption calculation is performed according to the formula $$P(d) = P(d_0) - 10n\log\left(\frac{d}{d_0}\right) - nW \times WAF$$

to obtain the at least one positioning signal strength P(d), wherein, d is a distance between the positioning points and an access point, $d_0$ is a distance between a signal obtained point and the access point, WAF is an obstacle fading factor, n is a signal fading factor, nW is the number of the obstacles between the positioning points and the access points, and $P(d_0)$ is a signal strength of the signal obtained points.

3. The method of building a locating service in a location-based system for a wireless network environment as claimed in claim 2, wherein when nW exceeds a predetermined obstacle number threshold value C, the at least one positioning signal strength is determined by $$P(d) = P(d_0) - 10n\log\left(\frac{d}{d_0}\right) - C \times WAF.$$

4. The method of building a locating service in a location-based system for a wireless network environment as claimed in claim 2, wherein the signal obtained point is located along a link between the positioning point and the access point.

5. The method of building a locating service in a location-based system for a wireless network environment as claimed in claim 2, wherein the signal obtained point is the access point, and $d_0=1$.

6. The method of building a locating service in a location-based system for a wireless network environment as claimed in claim 1, wherein a positioning modification step is further performed after the detection point calculation step, and is used for modifying the corresponding positioning information via a modification model.

7. The method of building a locating service in a location-based system for a wireless network environment as claimed in claim 1, wherein a service integration step is further performed after the detection point calculation step, and is used for activating a back-end application service according to the corresponding positioning information.

8. The method of building a locating service in a location-based system for a wireless network environment as claimed in claim 1, wherein the positioning algorithm is a Viterbi algorithm.

9. The method of building a locating service in a location-based system for a wireless network environment as claimed in claim 1, wherein the at least one positioning signal strength in the measuring step is a positioning signal strength from front, back, left and right directions.

* * * * *